(12) United States Patent
Gin et al.

(10) Patent No.: US 8,565,321 B2
(45) Date of Patent: Oct. 22, 2013

(54) METHOD AND SYSTEM FOR EFFICIENT PACKING OF DATA ACROSS QUEUE BLOCKS IN A SATELLITE

(75) Inventors: Alan Gin, Corona Del Mar, CA (US); Jen-Chieh Chien, Lake Forest, CA (US)

(73) Assignee: Broadcom Corporation, Irvine, CA (US)

( * ) Notice: Subject to any disclaimer, the term of this patent is extended or adjusted under 35 U.S.C. 154(b) by 1756 days.

(21) Appl. No.: 11/091,900

(22) Filed: Mar. 29, 2005

(65) Prior Publication Data

US 2005/0229216 A1   Oct. 13, 2005

Related U.S. Application Data

(60) Provisional application No. 60/556,871, filed on Mar. 29, 2004.

(51) Int. Cl.
*H04N 7/12* (2006.01)
*H04N 11/02* (2006.01)

(52) U.S. Cl.
USPC ............................... 375/240.26; 375/240.29

(58) Field of Classification Search
USPC .......... 725/63–72; 455/3.01–3.06; 375/240.26
See application file for complete search history.

(56) References Cited

U.S. PATENT DOCUMENTS

| | | | | |
|---|---|---|---|---|
| 5,144,425 A | * | 9/1992 | Joseph | 375/240.05 |
| 5,852,706 A | * | 12/1998 | Ogikubo et al. | 386/111 |
| 6,301,428 B1 | * | 10/2001 | Linzer | 386/52 |
| 6,920,178 B1 | * | 7/2005 | Curet et al. | 375/240.14 |
| 7,607,154 B2 | * | 10/2009 | Morello | 725/63 |
| 2001/0026585 A1 | * | 10/2001 | Kumaki | 375/240.01 |
| 2002/0105976 A1 | * | 8/2002 | Kelly et al. | 370/519 |
| 2002/0114397 A1 | * | 8/2002 | Todo et al. | 375/240.29 |
| 2004/0105403 A1 | * | 6/2004 | Lin et al. | 370/316 |
| 2004/0208121 A1 | * | 10/2004 | Gin et al. | 370/230 |
| 2005/0055715 A1 | * | 3/2005 | Minnick et al. | 725/58 |

* cited by examiner

*Primary Examiner* — Anner Holder
(74) *Attorney, Agent, or Firm* — Sterne, Kessler, Goldstein & Fox P.L.L.C.

(57) ABSTRACT

Provided are a method and system for processing at least two consecutive MPEG Q-blocks in a communications system, one of the Q-blocks being low rate and the other being high rate. The method includes back-filling an empty portion in a first transmitted Q-block with a first portion of second type data, the remaining portion of data of the second type data being included in another Q-block prior to transmission. The second type data crosses a boundary between the first and the other Q-block when the actual number is less than a corresponding maximum number. Finally, the method includes receiving within an associated subscriber modem one of the first and the second type data and not receiving the other of the first and the second type data when the second type data crosses the boundary.

11 Claims, 8 Drawing Sheets

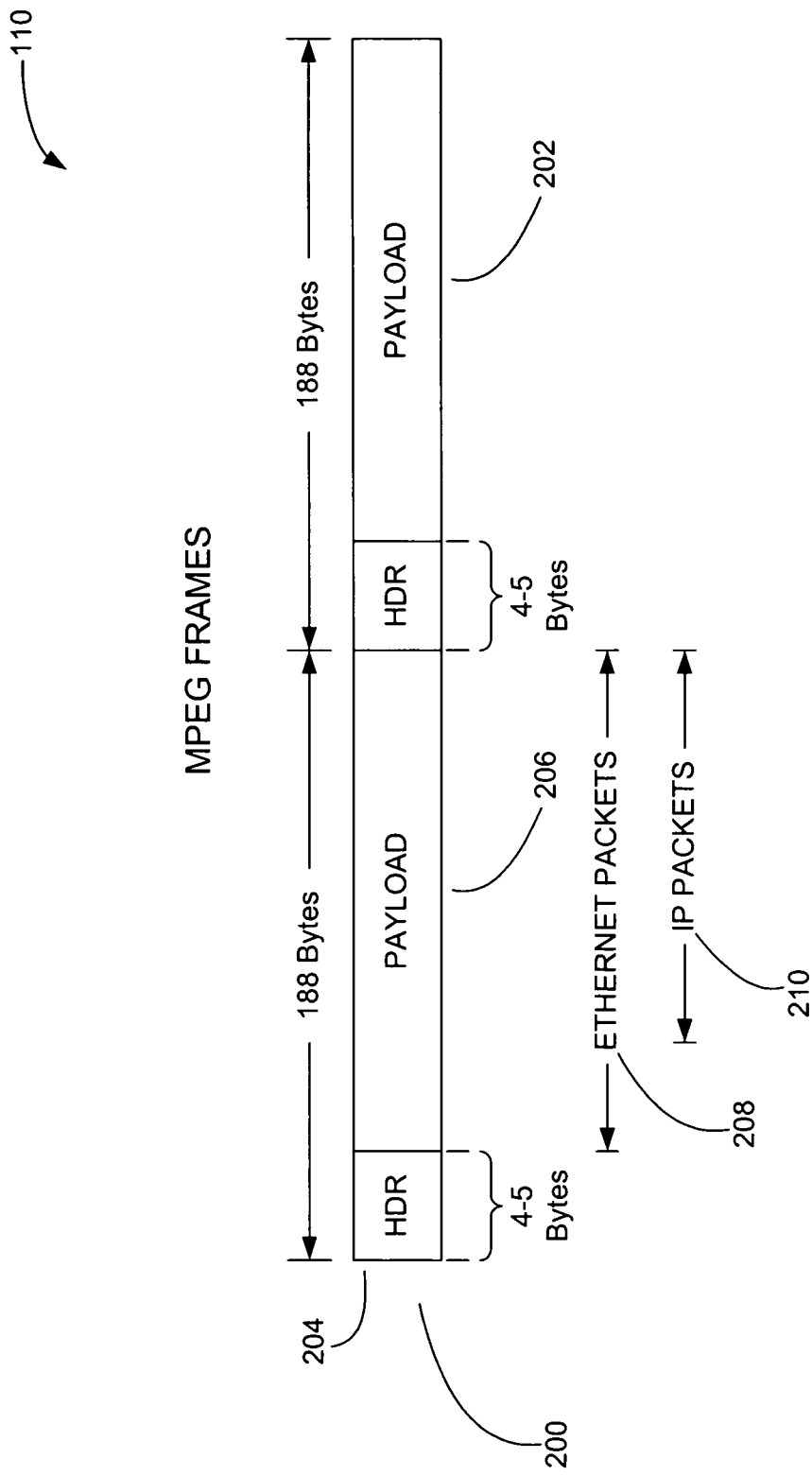
FIG. 2
(conventional)

METHOD AND SYSTEM FOR EFFICIENT PACKING OF DATA ACROSS QUEUE BLOCKS IN A SATELLITE

CROSS-REFERENCE TO RELATED APPLICATIONS

This application claims the benefit of U.S. Provisional Application No. 60/556,871, filed Mar. 29, 2005, which is incorporated herein in its entirey by reference.

BACKGROUND OF THE INVENTION

1. Field of the Invention

The present invention relates generally to transmission of data frames within a satellite based cable system. More particularly, the present invention relates to more efficiently packing data across queue blocks in a downstream adaptive modulation environment.

2. Related Art

Traditional cable systems transmit data in accordance with DOCSIS cable system standards. A common frame structure used within these DOCSIS based cable systems is the motion pictures expert group (MPEG) frame structure. Although the DOCSIS standards traditionally pertain to non-satellite based cable systems, various aspects and modifications of the DOCSIS standards now apply to both the upstream and downstream channels of satellite based cable systems. One such modification is known as adaptive modulation.

As known in the art, adaptive modulation is a signal processing technique used for downstream channels on traditional satellite based cable systems to maximize data rates. Adaptive modulation enables modulation schemes to adapt to changing transmission channel characteristics on a frame by frame basis. In one implementation, for example, adaptive modulation provides an ability to change physical downstream parameters, particularly along MPEG frame boundaries.

Satellite based cable systems typically use a satellite modem termination system (SMTS) to transmit data frames via a satellite network to cable subscribers. Each cable subscriber has a modem (subscriber modem) specifically configured to receive specific frames from among a stream of transmitted MPEG data frames. Adaptive modulation enables the SMTS to send the specific data frames within the stream to the different subscriber modems based on that modem's ability to receive data. Thus, within a transmitted data stream including consecutive data frames, the first frame may go to a first subscriber modem and the second data frame may go to a second subscriber modem. In such a transmission scenario, in order for the SMTS to use the most efficient transmission parameters and optimize the use of available data width, MPEG frame timing is absolutely critical.

In order to optimize the operational speed and efficiency of satellite based cable systems, an appropriate adaptive modulation scheme is desirably chosen. The appropriate scheme will enable the SMTS to send the MPEG to the intended subscriber modem. Several components within the traditional SMTS are particularly relevant to this process. These relevant components include a media access control (MAC) chip for performing media access control and packet processing of internet protocols (IPs) embedded within the MPEG data frame. Also included is a MAC clock, for time stamping the MPEG data frames, and a modulator.

What is needed, however, are techniques to more efficiently pack data across queue blocks in downstream adaptive modulation environments.

SUMMARY OF THE INVENTION

Consistent with the principles of the present invention as embodied and broadly described herein, the present invention includes a method for processing at least two consecutive MPEG Q-blocks in a communications system, one of the Q-blocks being low rate and the other being high rate, each of the Q-blocks (i) including an actual number of MPEG frames and (ii) being configured for accommodating a maximum number of MPEG frames. The communications system includes a satellite modem termination system and a subscriber modem, the subscriber modem including a multi-rate receiver and a field programmable gate array (FPGA).

The method includes transmitting a first of the at least two Q-blocks and determining in the first transmitted Q-block whether the actual number of MPEG frames is less than the corresponding maximum number of MPEG frames, the first transmitted Q-block including first type data having at least a filled portion, the other Q-block including a second type data. An empty portion is formed in the first transmitted Q-block when the actual number is less than the corresponding maximum number.

The method also includes back-filling the empty portion in the first transmitted Q-block with a first portion of the second type data, the remaining portion of data of the second type data being included in the other Q-block prior to transmission. The second type data crosses a boundary between the first and the other Q-block when the actual number is less than the corresponding maximum number. Finally, the method includes receiving within the subscriber modem one of the first and the second type data and not receiving the other of the first and the second type data when the second type data crosses the boundary.

Further features and advantages that the present invention as well as structure and operation of various embodiments of the present invention, are described in detail below with reference to the accompanying drawings.

BRIEF DESCRIPTION OF THE DRAWINGS/FIGURES

The accompanying drawings, which are incorporated in and constitute part of the specification, illustrate embodiments of the present invention and, together with the general description given above and the detailed description of the embodiments given below, serve to explain the principles of the invention. In the drawings:

FIG. 2 is an illustration of a conventional MPEG data frame;

DETAILED DESCRIPTION OF THE INVENTION

Figure 1:
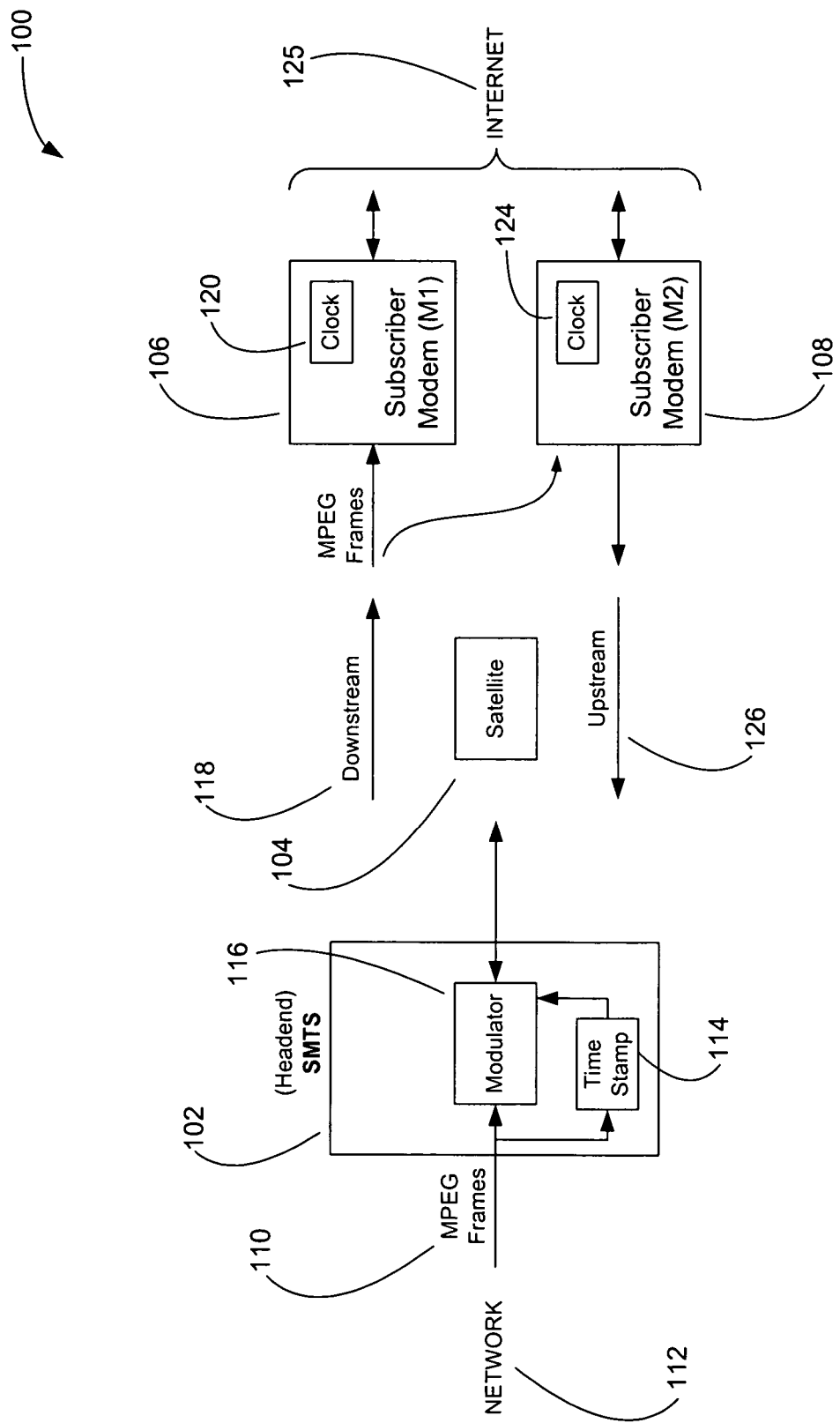
FIG. 1 is a block diagram illustration of a satellite based communications system.

The following detailed description of the present invention refers to the accompanying drawings that illustrate exemplary embodiments consistent with this invention. Other embodiments are possible, and modifications may be made to the embodiments within the spirit and scope of the invention. Therefore, the following detailed description is not meant to limit the invention. Rather, the scope of the invention is defined by the appended claims.

It would be apparent to one skilled in the art that the present invention, as described below, may be implemented in many different embodiments of hardware, software, firmware, and/or the entities illustrated in the drawings. Any actual software code with the specialized controlled hardware to implement the present invention is not limiting of the present invention. Thus, the operation and behavior of the present invention will be described with the understanding that modifications and variations of the embodiments are possible, given the level of detail presented herein.

FIG. 1 is a block diagram illustration of a satellite based cable system constructed in accordance with an embodiment of the present invention. In FIG. 1, a satellite based cable system 100 includes an SMTS (head-end) 102, a satellite 104, and subscriber modems 106 and 108. The SMTS 102 is configured to receive MPEG data frames 110 transmitted via a conventional network 112.

FIG. 2 provides a more detailed illustration of a conventional structural format of the MPEG frames 110. In FIG. 2, the MPEG frames 110 can include, for example, individual MPEG frames 200 and 202. Each MPEG frame includes a header portion 204 and a payload portion 206 that are 188 bytes in length combined. The header 204 is typically four to five bytes in length. Within the context of the satellite cable system 100, shown in FIG. 1, each of the MPEG frames 110 includes Ethernet packets 208 within its payload portion. And within each of the Ethernet packets 208, are IP packets 210.

Referring back to the example of FIG. 1, the MPEG frames 110 are forwarded from the network 112, to the SMTS 102. Within the SMTS 102, some of the MPEG frames 110 are time stamped by a time stamping device 114, which could be a system clock. Subsequently, the MPEG frames 110 are modulated within a modulator 116 in preparation for transmission.

In the example of FIG. 1, the modulated MPEG frames are forwarded, via the satellite 104, along a downstream communications path 118 to one of the subscriber modems 106 and 108. The subscriber modems 106 and 108 respectively include clocks 120 and 124 to synchronize reception and performance of other timing tasks associated with the received MEPG frames 110. Next, the MPEG frames can be forwarded to some other network such as the Internet 125.

In the present invention, as briefly noted above, adaptive modulation provides the ability to change downstream transmission parameters in accordance with the communications link and processing capability of the receiving subscriber modems. More particularly, adaptive modulation entails modifying the downstream physical parameters and is triggered by the frame boundaries of the MPEG frames 110. Although MPEG frames include numerous physical parameters, the physical parameters of interest in the present invention include modulation, code rate, and the size and error rate associated with the Reed Solomon code word.

By way of background, some downstream subscriber modems are not required to receive the entire content of each MPEG frame, since a portion of the frame data may be intended for a different modem. These subscriber modems, therefore, only receive a subset of the MPEG frames. In non-satellite based cable systems, this data "apportionment" is not problematic because all MPEG frames are transmitted with the same physical parameters.

Data apportionment, however, is somewhat inefficient in the non-satellite based cable systems because all transmitted MPEG frames must satisfy the capabilities of the worst case modem. Some subscriber modems can receive downstream data fairly robustly. On the other hand, some subscriber modems have a less robust downstream connection because of noise, etc. Therefore, in order to accommodate all of the subscriber modems, the SMTS must choose physical consistent with the least capable subscriber modem. This process ensures that every modem can receive the transmission.

As noted above, certain of the downstream physical parameters can be changed from frame to frame, or from Q-block to Q-block. Among these changeable parameters are the modulation, the code rate, and the size and error rate of the Reed Solomon code word. Changing the modulation, for example, provides certain advantages. Using more complex modulation schemes facilitates use of higher transmission data rates. On the other hand, if a more complex modulation scheme and a higher data rate are selected, all of the modems must be able to receive at these higher data rates.

Typical code rate values can range between $\frac{1}{3}$, $\frac{1}{2}$, $\frac{1}{4}$, $\frac{2}{3}$, $\frac{5}{8}$, and $\frac{7}{8}$. Within this scale, for example, $\frac{1}{3}$rd is typically used for data and $\frac{2}{3}$rds provides better error correction. Although code rates of $\frac{2}{3}$ provide better error correction, meaning they are more robust, they are also inefficient. Code rates in the range of $\frac{7}{8}$ are very efficient, but are less robust.

The size and the error rate of the Reed Solomon code word is one other downstream parameter that can be changed within the context of the present invention. As a general rule of thumb, the smaller the Reed Solomon code word, and the bigger its corresponding segment, the smaller the amount of actual data that can be represented.

On cable modems, the modulation scheme, the code rate, and the Reed Solomon code word are set and rarely change. That is, all modems receive at the same rate. However, with adaptive modulation, and why this concept is significant in a satellite environment is that the modulation, the code rate, and the size and error rate associated with the Reed Solomon code word can be changed, based upon MPEG frame boundaries.

As an example of the flexibility of adaptive modulation, in the example of FIG. 1, the subscriber modem 106 may be able to receive at a signal to noise ratio level of 15, which would be representative of a fairly strong modem. However, the subscriber modem 108 may only be able to receive at a signal to noise ratio level of 8, representative of a much weaker modem. In this example, the information transmitted to the subscriber modem 108 must be transmitted with more robust downstream physical parameters. Thus, the subscriber modem 108 might need to receive data using a more complex modulation scheme.

At the same time, the subscriber modem 106 receives data at a higher signal to noise ratio level, so it might be able to receive data at a modulation rate of 16 pre-emphasized-de-emphasized amplitude-modulation (PRAM) and a code rate of $\frac{7}{8}$. The advantage here is that if one were to examine the downstream transmitted MPEG data frames, for example, the MPEG frames 200 and 202, the MPEG frame 200 can contain data intended for both the subscriber modem 106 and 108. The subscriber modem 106 may be able to receive the MPEG frame 200 and 202 because of more efficient and more robust data handling capability within the subscriber modem 106. Consequently, the subscriber modem 106 may occupy a much smaller amount of bandwidth because it can handle more data with less effort.

Figure 3:
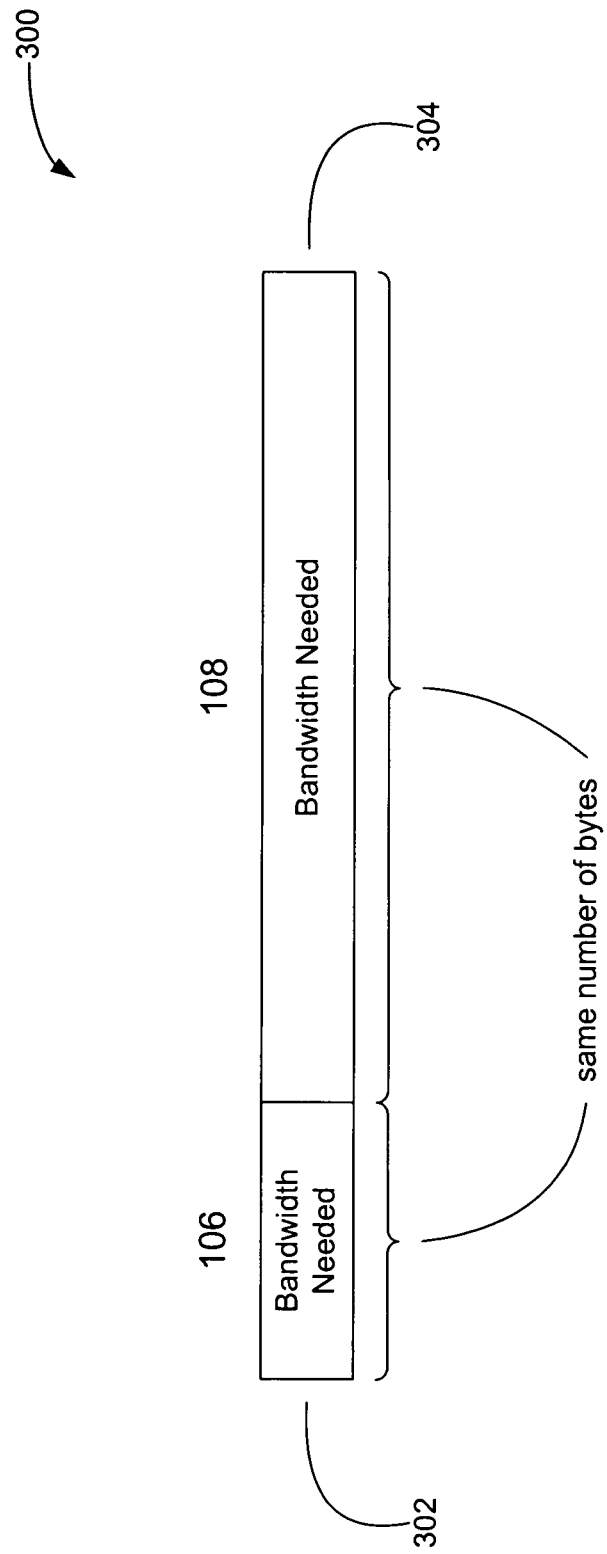
FIG. 3 is an illustration of bandwidth requirements for transmitting different data frames to different subscriber modems.

FIG. 3 is an illustration of relative differences in bandwidth requirements that can exist between the subscriber modems 106 and 108. As illustrated in FIG. 3, a comparatively small amount of bandwidth 302 is required by the subscriber modem 106 because of its more efficient data handling capability. The subscriber modem 108, on the other hand, may need a greater amount of bandwidth 304 in order to receive the same number of data bytes as the subscriber modem 106. Thus, in terms of time domain, the lower rate modem 108 is occupying more bandwidth 304, and the higher rate modem 106 requires less bandwidth 302.

Stated another way, the benefit of downstream adaptive modulation is demonstrated in the example of a single satellite sending data frames to 1000 satellite modems. For purposes of illustration, 20 of the satellite modems may be under very cloudy or even rainy conditions, whereby their signal to noise ratio ability to receive will decrease substantially. At the same time, there may still be more than 980 modems that can receive at a higher data rate. Adaptive modulation eliminates the need to bring the entire satellite based cable system down to its least common denominator modem. Adaptive modulation provides this ability by providing a more efficient manner to distribute available bandwidth.

Figure 4:
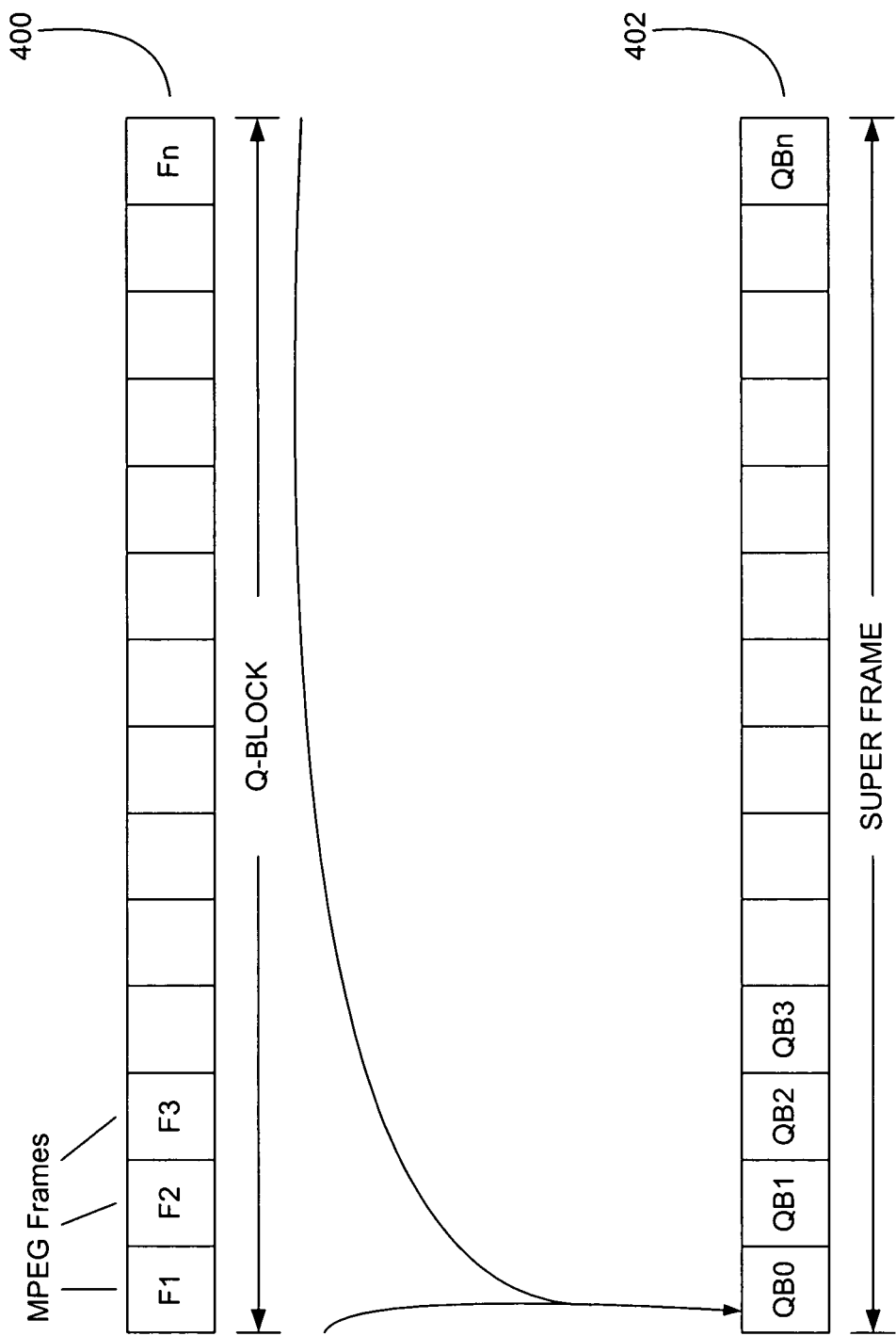
FIG. 4 is an illustration of Q-blocks and super frames associated with MPEG standards.

FIG. 4 is an illustration of additional structure within MPEG data frames. The DOCSIS system specification has been adapted to describe an efficient approach to collecting and transmitting MPEG frames. This modified DOCSIS based approach entails grouping together MPEG frames that have the same physical parameters and then transmitting these frames consecutively. These consecutively transmitted frames form Q-blocks, such as a Q-block 400, as illustrated in FIG. 4. A super-frame 402 (assembled within the SMTS 102) is representative of a collection of consecutively transmitted Q-blocks. Consistent with this approach the Q-block 400 includes MPEG frames F1 through Fn, which all share the same physical parameters.

Within the super-frame 402, each of the Q-blocks QB0-QBn, may have different physical parameters. However, each of the Q-blocks QB0-QBn, will have the same basic transmission parameters. One of these basic transmission parameters is the symbol rate. That is, all of the symbols within the Q blocks QB0-QBn share a common transmission symbol rate.

An additional requirement of the DOCSIS specification is a requirement that all of the downstream MPEG super-frames, such as the super-frame 402, must be time stamped. Within the DOCSIS specification, a 32 bit time stamp value is stored within registers of the modulators, and other components, within the SMTS 102 and the subscriber modem 106. Each of the associated time stamp registers is incremented upon generation or receipt of a super-frame.

Figure 5:
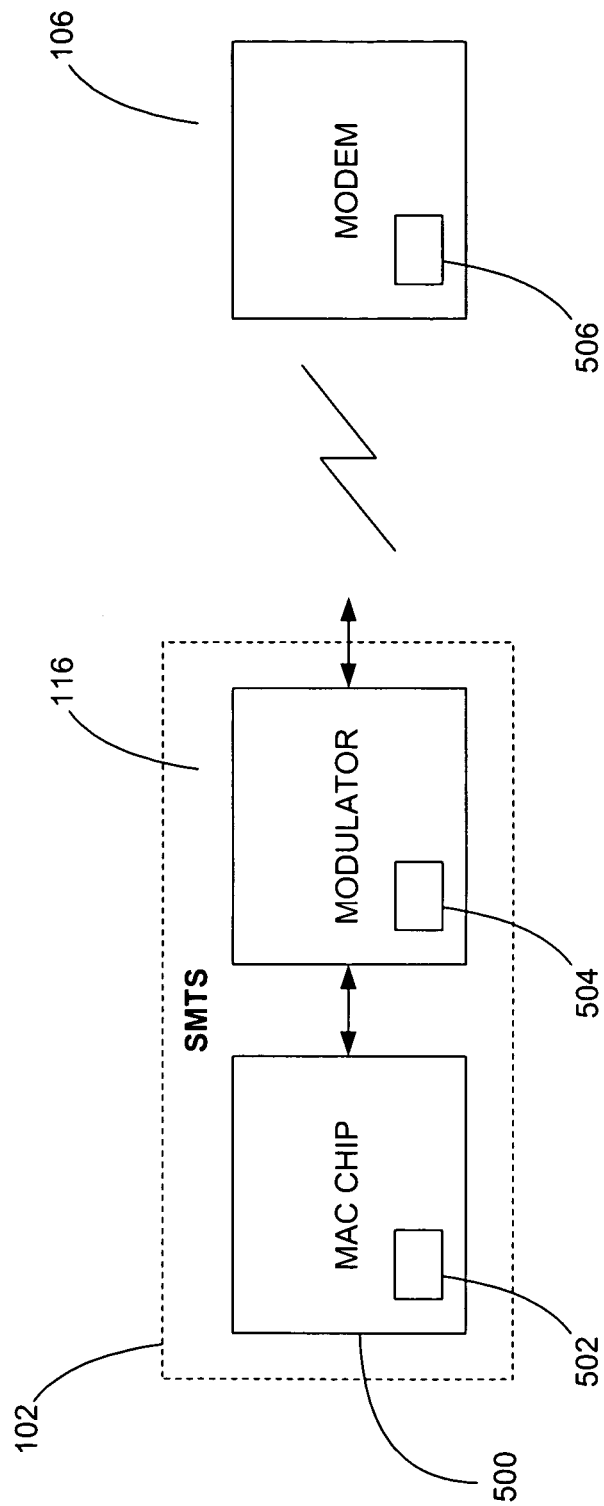
FIG. 5 is a block diagram illustration of the SMTS and the modem M1 shown in FIG. 1.

FIG. 5 provides a more detailed block diagram illustration of the SMTS 102 and the modem 106 as well as additional details of the time stamping process. In FIG. 5, a more detailed block diagram illustrates that the SMTS 102 includes a MAC chip 500 and the modulator 116. The MAC 500 provides processing of MAC layer protocol information for the IP packets 210 embedded within the MPEG frames, as noted above.

The MAC chip 500 and the modulator 116 respectively include time stamp registers 502 and 504. It is desirable that the time stamp values stored within the registers 502 and 504 be as accurate as possible. Time stamp accuracy is desirable so that when the subscriber modem 106 receives super frames, it can perform an internal timing check. During this check, the subscriber modem 106 compares the time stamps of the received super frame with time stamps stored within an internal time stamp register 506.

The present invention provides an approach for enhancing the ability of the system 100 to more carefully pack and/or process MPEG frame data that extends across a boundary between two adjacent Q-blocks. A technique is also provided to resolve problems created when one of these two Q-blocks contains one portion of data transmitted to a low rate modem and another portion of data intended for a different high rate modem.

Figure 6:
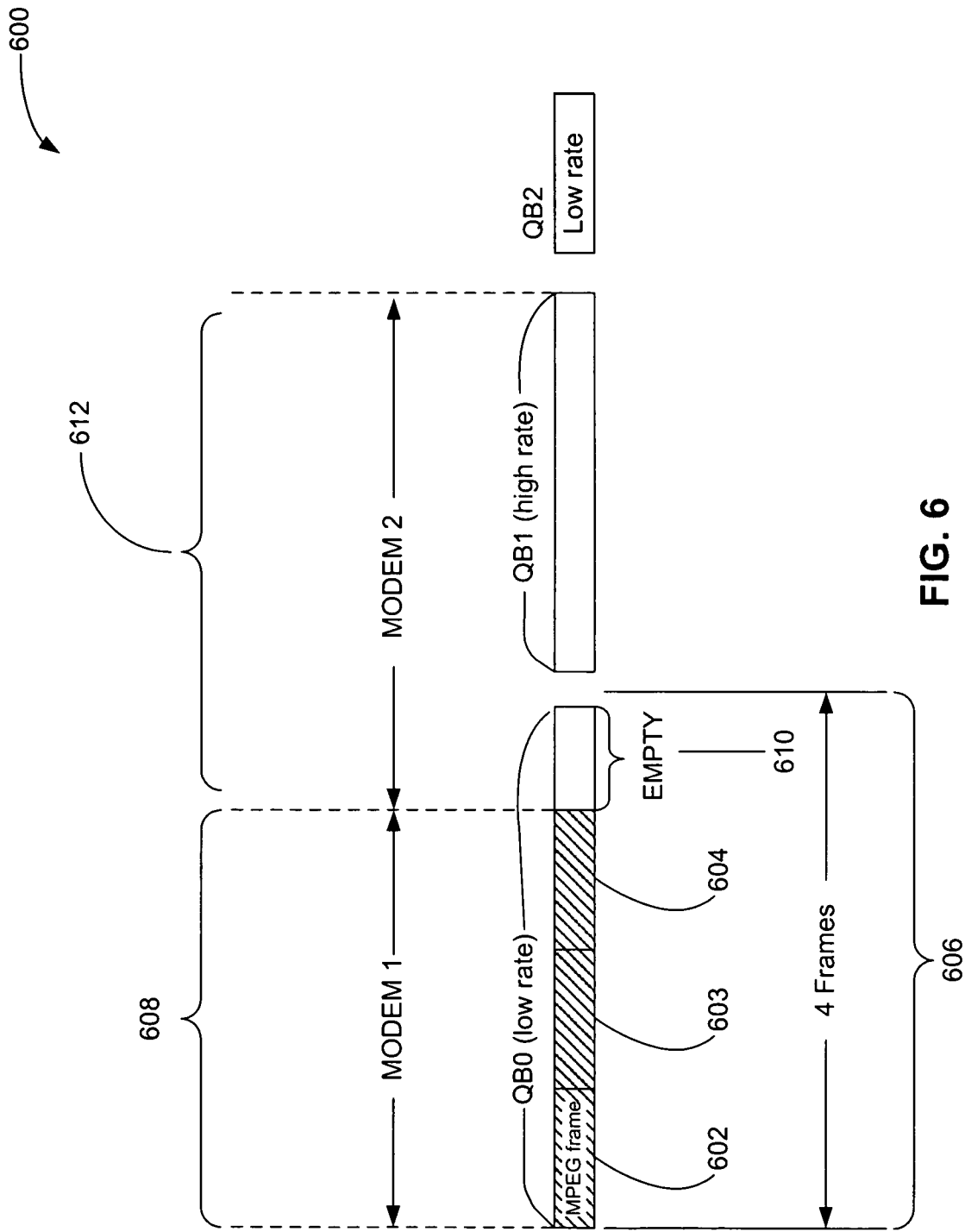
FIG. 6 is an illustration of MPEG Q-blocks arranged in accordance with an embodiment of the present invention.

FIG. 6 is an illustration of an MPEG data stream 600. The MPEG data stream 600 includes frame data that extends across Q-block boundaries. In FIG. 6, a Q-block QB0 includes MPEG frames 602, 603, and 604. As noted above, Q-blocks include MPEG frames that share the same physical parameters. In the case of the Q-block QB0, the MPEG frames 602-604 are all transmitted to the modem 104, which receives data at a low data rate. Thus, QB0 will be referred to herein as a low rate Q-block. On the other hand, Q-block QB1 is a high rate Q-block, structured to send data to the modem 106, which is capable of receiving data at a higher data rate.

In the example of FIG. 6, the modem 104 is unable to see the high rate data within the Q-block QB1. The modem 106, however, can see the low rate data within the Q-block QB0, since modems that can see higher rate data can also typically see lower rate data. An additional point advanced by the illustration of FIG. 6 is that the Q-blocks are structured to accommodate a finite number (maximum) of MPEG frames, or DOCSIS packets. Thus, quite often, the data being sent to a particular modem may not be enough to fill up an entire Q-block.

In the example of FIG. 6, the Q-block QB0 has a maximum length 606 of 4 MPEG frames. However, the actual number of MPEG frames 608 awaiting transmission by an SMTS to the modem 104 is (i.e., 602-604) is three MPEG frames. Therefore, an empty space 610 is formed within the Q-block QB0 and is transmitted along with the MPEG frames 602-604, when the Q-block QB0 is transmitted.

The present invention discloses a technique to efficiently use (e.g. back-fill) and process the empty space 610 within the Q-block QB0. More specifically, a technique is provided to utilize this empty space 610 in the Q-block QB0 by filling it with low rate data to be transmitted to the high rate modem 106.

Since the Q-block QB0 is transmitted at a low data rate, the empty space 610 of is filled with low rate data. However, the low rate data packed into the empty space 610 will be transmitted to the modem 106, not to the modem 104. That is, the additional data structured to fill the empty space 610 is a first segment of a larger data portion 612 transmitted to the modem 108 in conjunction with the Q-block QB1.

Filling the empty space 610 with low rate data for transmission to the modem 108 is possible given the ability of the modem 108 to also see low rate data. Under this scheme, the data is packed into available frame space to more efficiently utilize available bandwidth and other scarce system resources. When empty Q-block space is back-filled, for example, with DOCSIS packets, components within the receiving subscriber modems must be able to properly separate the data and receive only the data intended for that particular modem.

Figure 7:
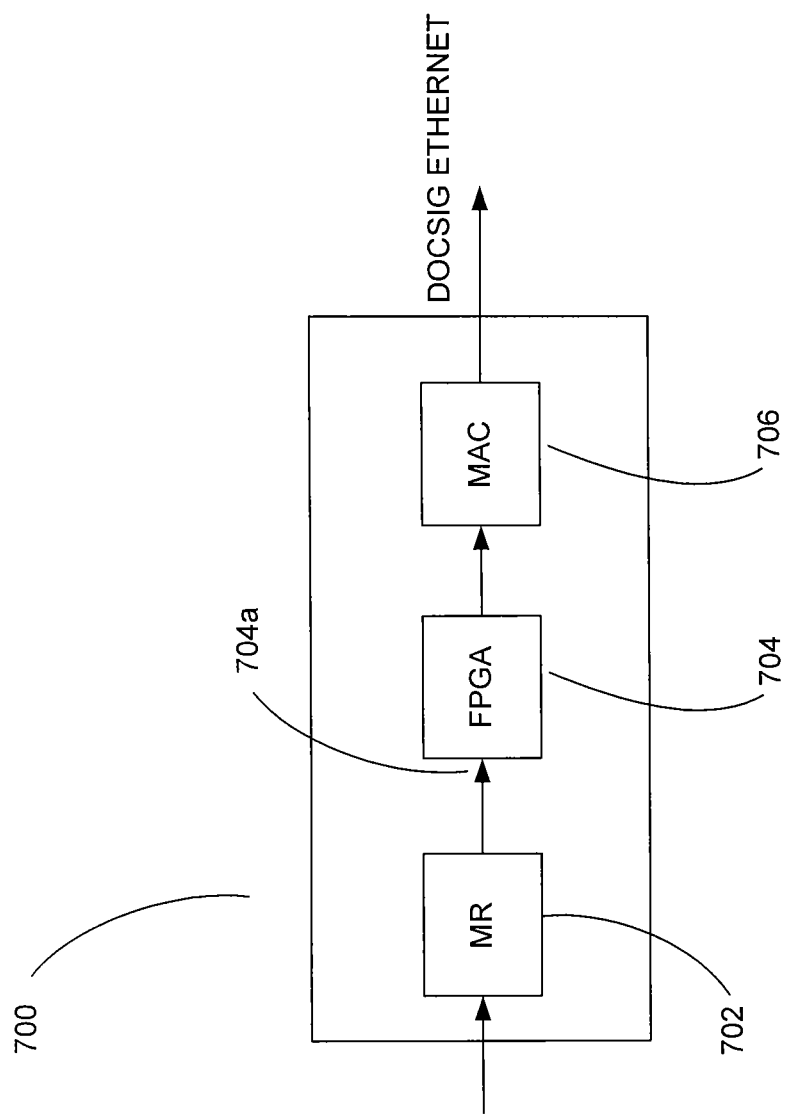
FIG. 7 is a block diagram of a subscriber modem constructed and arranged in accordance with an embodiment of the present invention.

FIG. 7 is an exemplary embodiment of a subscriber modem 700 configured in accordance with an embodiment of the present invention. In FIG. 7, the subscriber modem 700 includes a multi-rate receiver (MR) 702, a field programmable gate array (FPGA) 704 and a MAC device 706. Operational settings of the MR 702 are among the factors determining whether the subscriber modem 700 will be able to receive low rate or high rate data.

During a communications session, an SMTS will transmit the data stream 600 to a number of subscriber modems. Each modem will receive the entire data stream 600 but will only be able to process selected Q-blocks, based on the receive capability of the subscriber modem. A low rate modem, such as the low rate modem 106, will only see the low rate Q-blocks QB0 and QB2. That is, when QB0 is transmitted, the low rate modem 106 will sense and receive QB0. When the Q-block QB0 ends, the low rate modem 106 will not see anything, since it cannot see the high rate Q-block QB1. And when QB1 ends, the low rate modem 106 will sense and receive the low rate Q-block QB2.

Thus, the low rate subscriber modem 106 will not be able to see the high rate data of QB1 during the time period in which the high rate Q-block QB1 is transmitted. However, if the empty space 610 of QB0 is back-filled with low rate data for transmission to the high rate modem 108, as described above, the subscriber low rate modem 106 will be able to see this data (at the end of the QB0), since this data is low rate.

Within the exemplary subscriber modem 700, the MR 702 initially receives the transmitted data stream 600 containing the low rate (QB0, QB2) and high rate (QB1) Q-blocks. If the MR 700, for example, is configured to receive low rate data, it will receive QB0-QB2, but will produce outputs representative only of the received low rate Q-blocks (QB0 and QB2). The MR 702, in essence, will not be able to see the high rate Q-block QB1, and therefore, will not produce an output corresponding to the QB1.

In the case of the QB0, however, the MR 702 will be able to see both the actual MPEG frames 608 (intended for a low rate modem, e.g. modem 106) and the low rate data within the empty space 610 (intended for a high rate modem, e.g. modem 108). Although the data within the empty space 610 is intended for a high rate modem, it can also be seen by the modem 700 (configured as a low rate modem) because it's low rate. The outputs of the MR 702 are then provided as inputs to the FPGA 704.

The FPGA 702 knows, based upon well known DOCSIS MPEG protocols embedded within a header to the MPEG frames 608 (output from the MR 702), how many MPEG frames 608 are to follow. These DOCSIS MPEG protocols include signals such as PS-valid, PS-synch, PS-data, and PS error. Based upon these protocols, the FPGA 702 calculates to determine precisely how much of the data within the low rate Q-block QB0 it is actually intended to receive.

After receiving the MPEG frames 608 intended for the low rate modem 700, the FPGA 704 will essentially deactivate an interface 704a between the MR 702 and the FPGA 704. This deactivation will prevent the forwarding of the extra MPEG frames (within the empty space 610) to the MAC device 706.

Deactivation of the interface 704a is necessary because the MR 702 cannot cleanly and consistently distinguish the actual MPEG frames 608 from the data within the empty space 610 (intended for a high rate modem, e.g. modem 108). Therefore, in a case where the number of MPEG frames transmitted within a Q-block is less than the static size of the Q-block, the FPGA 704 will disable the interface 704a to ensure that the additional data, within a Q-block's empty space, does not generate errors in downstream processing. In this manner, the low rate modem 700 receives low rate data within a particular low rate Q-block intended for the modem 700, but ignores additional data within the low rate Q-block not intended for the modem 700.

Figure 8:
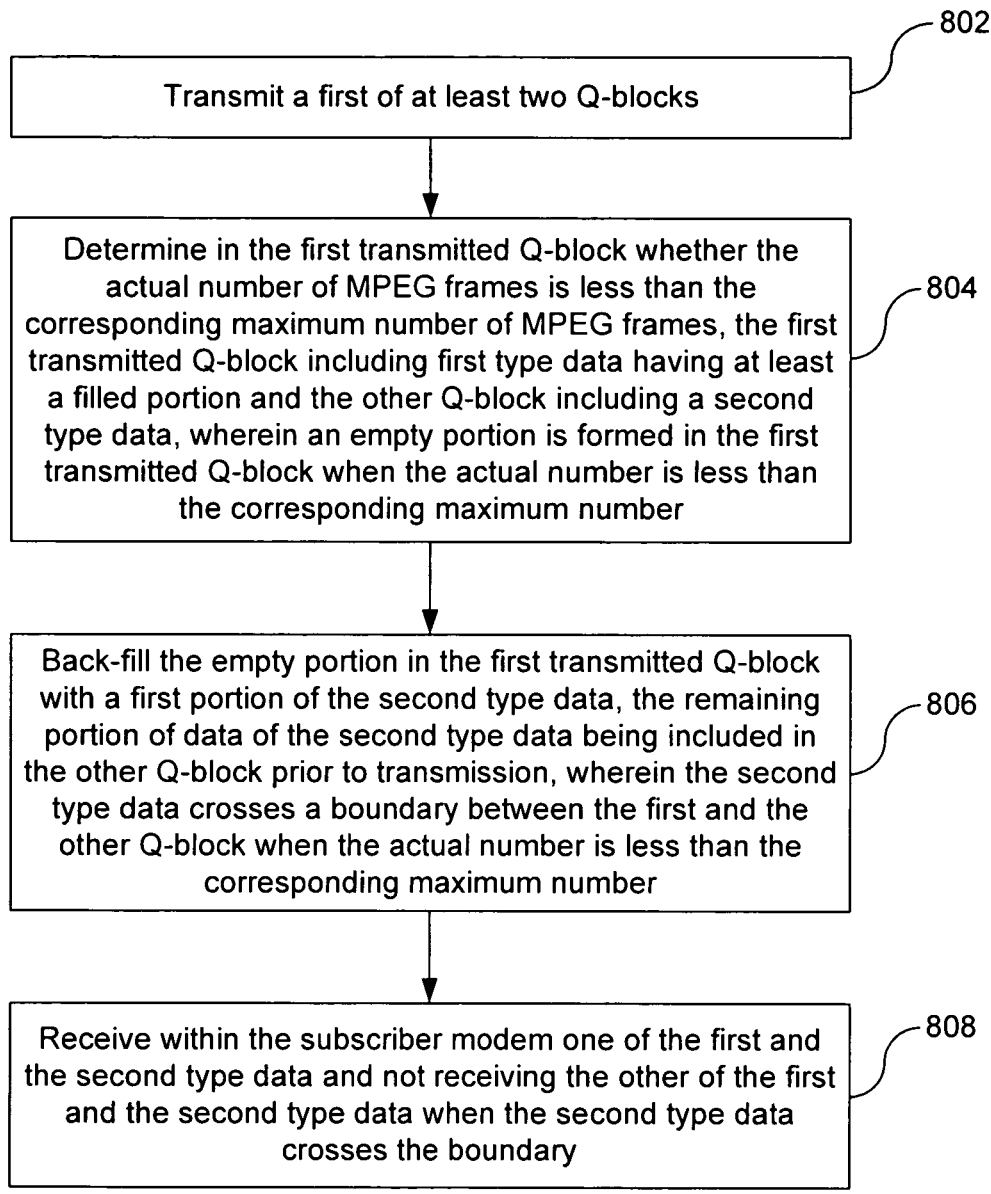
FIG. 8 is a flow chart of an exemplary method of practicing an embodiment of the present invention.

FIG. 8 is a flowchart of an exemplary method 800 of practicing an embodiment of the present invention. In FIG. 8, a first of at least two Q-blocks is transmitted, as indicated in step 802. In step 804, it is determined in the first transmitted Q-block whether the actual number of MPEG frames is less than the corresponding maximum number of MPEG frames. The first transmitted Q-block includes first type data having at least a filled portion and the other Q-block including a second type data, wherein an empty portion is formed in the first transmitted Q-block when the actual number is less than the corresponding maximum number.

Next, in step 806 of the method 800 of FIG. 8, the empty portion in the first transmitted Q-block is back-filled with a first portion of the second type data. The remaining portion of data of the second type data is included in the other Q-block prior to transmission, wherein the second type data crosses a boundary between the first an the other Q-block when the actual number is less than the corresponding maximum number. In step 808, one of the first and second type data is received within the subscriber modem and the other of the first and second type data is not received when the second type data crosses the boundary.

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed.

Any such alternate boundaries are thus within the scope and spirit of the claimed invention. One skilled in the art will recognize that these functional building blocks can be implemented by analog and/or digital circuits, discrete components, application-specific integrated circuits, firmware, processor executing appropriate software, and the like, or any combination thereof. Thus, the breadth and scope of the present invention should not be limited by any of the above-described exemplary embodiments, but should be defined only in accordance with the following claims and their equivalents.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A method for transmitting at least two consecutive data blocks to at least two modems in an adaptive modulation based communications system environment, each of the data blocks being configured for a maximum number of moving picture expert group (MPEG) frames, the method comprising:

determining in the communications system environment whether a number of MPEG frames in a first of the at least two data blocks is less than a maximum number of MPEG frames, wherein when the number of MPEG frames is less than the maximum number of MPEG frames, a difference therebetween represents a corresponding number of empty frames in the first data block; and filling one or more of the empty frames with data from a second of the at least two data blocks, the data filling the one or more empty frames being transmitted to one of the modems and the data in the other frames of the first data block being transmitted to a different one of the modems.

2. The method of claim 1, wherein the number of MPEG frames in the first data block include a first type of data and the number of MPEG frames in the second data block include a second type of data.

3. The method of claim 2, wherein the at least two data blocks are Queue blocks and wherein the communications system environment includes a satellite modem termination system (SMTS).

4. The method of claim 2, wherein the communications system environment includes a satellite modem termination system (SMTS); and
wherein the determining occurs in accordance with data over cable service interface specification (DOCSIS) standards.

5. The method of claim 4, wherein the second type of data crosses a boundary between the first data block and the second data block after the filling.

6. The method of claim 5, further comprising transmitting the first and second data blocks.

7. The method of claim 6, wherein the first data block is low rate and the second data block is high rate.

8. A method for processing at least two consecutive data blocks in an adaptive modulation based communications system environment including at least two modems, each of the data blocks being configured for a maximum number of moving picture expert group (MPEG) frames, the method comprising:
determining in the modem whether a number of MPEG frames in a first of the at least two data blocks is less than a maximum number of MPEG frames of the first data block, wherein, when the number of MPEG frames is less than the maximum number of MPEG frames, a difference therebetween represents a corresponding number of empty frames in the first data block, one or more of the empty frames being filled with data from a second of the at least two data blocks;

receiving the first and second data blocks in first and second modems of the at least two modems, respectively; and processing only the MPEG frames of the first data block within the first modem and processing the second data block and the filled data in the second modem.

9. The method of claim 8, wherein the communications system environment operates in accordance with data over cable service interface specification (DOCSIS) standards.

10. The method of claim 9, wherein the at least two data blocks are Queue blocks.

11. An apparatus for processing at least two consecutive data blocks in an adaptive modulation based communications system environment including at least two modems, each of the data blocks being configured for a maximum number of moving picture expert group (MPEG) frames, the apparatus comprising:
means for determining in the modem whether a number of MPEG frames in a first of the at least two data blocks is less than a maximum number of MPEG frames of the first data block, wherein, when the number of MPEG frames is less than the maximum number of MPEG frames, a difference therebetween represents a corresponding number of empty frames in the first data block, one or more of the empty frames being filled with data from a second of the at least two data blocks;

means for receiving the first and second data blocks in first and second modems of the at least two modems, respectively; and means for processing only the MPEG frames of the first data block within the first modem and processing the second data block and the filled data in the second modem.

* * * * *

UNITED STATES PATENT AND TRADEMARK OFFICE
CERTIFICATE OF CORRECTION

| | | |
|---|---|---|
| PATENT NO. | : 8,565,321 B2 | Page 1 of 1 |
| APPLICATION NO. | : 11/091900 | |
| DATED | : October 22, 2013 | |
| INVENTOR(S) | : Gin et al. | |

It is certified that error appears in the above-identified patent and that said Letters Patent is hereby corrected as shown below:

In the Claims

Column 9, line 4, Claim 1, please replace "frames, wherein when the number" with --frames, wherein, when the number--.

Signed and Sealed this
Fourth Day of February, 2014

Michelle K. Lee
*Deputy Director of the United States Patent and Trademark Office*